United States Patent [19]
Suzuki

[11] Patent Number: 6,021,166
[45] Date of Patent: Feb. 1, 2000

[54] CELLSITE STATION HAVING SWITCHER TO ESTABLISH CONNECTIONS BETWEEN RF UNITS AND MODEM UNITS TO IMPLEMENT INTRA-CELL HANDOVER

[75] Inventor: Hideto Suzuki, Tokyo, Japan

[73] Assignee: NEC Corporation, Tokyo, Japan

[21] Appl. No.: 08/978,242

[22] Filed: Nov. 25, 1997

[30] Foreign Application Priority Data

Nov. 25, 1996 [JP] Japan ................................. 8-313958

[51] Int. Cl.⁷ .................. H04B 7/10; H04L 1/02
[52] U.S. Cl. .................. 375/347; 375/267; 455/273; 370/331
[58] Field of Search ................................. 375/347, 267, 375/299, 200; 455/561, 562, 137, 273; 370/335, 342, 331

[56] References Cited

U.S. PATENT DOCUMENTS

| | | | |
|---|---|---|---|
| 5,065,449 | 11/1991 | Gordon et al. | 455/15 |
| 5,119,501 | 6/1992 | Perry et al. | 455/562 |
| 5,175,878 | 12/1992 | Davis et al. | 455/103 |
| 5,371,738 | 12/1994 | Moelard et al. | 370/331 |
| 5,557,603 | 9/1996 | Barlett et al. | 370/16 |
| 5,701,596 | 12/1997 | Meredith et al. | 455/103 |
| 5,752,200 | 5/1998 | Meredith et al. | 455/562 |
| 5,812,935 | 9/1998 | Kay | 455/56.1 |

FOREIGN PATENT DOCUMENTS

| | | |
|---|---|---|
| 61-63120 | 4/1986 | Japan. |
| 4-347937 | 12/1992 | Japan. |
| 7-502391 | 3/1995 | Japan. |
| 8-228176 | 9/1996 | Japan. |
| 9-55977 | 2/1997 | Japan. |

*Primary Examiner*—Don N. Vo
*Assistant Examiner*—Phuong Phu
*Attorney, Agent, or Firm*—Foley & Lardner

[57] ABSTRACT

In a cellular mobile communication system, a number of transmit/receive units are respectively connected to antenna sites for conversion of signals between a radio frequency and a baseband frequency and a number of modulator/demodulator units is provided. Control circuitry receives signals from the modulator/demodulator units indicating strengths of signals received by the antennas and controls a switcher for establishing connections between the transmit/receive units and the modulator/demodulator units. Control circuit further controls a combining circuit to combine the signals associated with at least two of the modulator/demodulator units during an intra-cell handover.

17 Claims, 2 Drawing Sheets

CELLSITE STATION HAVING SWITCHER TO ESTABLISH CONNECTIONS BETWEEN RF UNITS AND MODEM UNITS TO IMPLEMENT INTRA-CELL HANDOVER

BACKGROUND OF THE INVENTION

1. Field of the Invention

The present invention relates generally to cellular mobile communication systems, and specifically to a technique for meeting an increased demand for cellular communications by splitting a cell-site area. More specifically, the present invention relates to an intra-cell handover technique which is particularly suited for CDMA (code division multiple access) communication systems.

2. Description of the Related Art

In cellular mobile communication systems, a cell-site area is often split into a plurality of small areas or microcells to meet an increasing number of phone calls and. When a communicating mobile station is crossing the boundary of adjacent microcells, an intra-cell handover is necessary if the call is to be maintained. Since the handover involves detection of mobile-transmitted signals from several microcells, determination of their relative strengths and selective establishment of radio links according to the relative strengths, the circuits, wirings and algorithm required are very complex to implement.

SUMMARY OF THE INVENTION

It is therefore an object of the present invention to provide a simple and yet effective solution to the problem of intra-cell handover.

According to a first aspect of the present invention, there is provided a cellular mobile communication system comprising a plurality of antennas, a plurality of transmit/receive units connected respectively to the antennas for conversion of signals between a radio frequency and a frequency lower than the radio frequency, and a plurality of modulator/demodulator units. Control circuitry is provided for receiving signals from the modulator/demodulator units indicating strengths of signals received by the antennas. A switcher is responsive to a first control signal from the control circuitry for establishing connections between the transmit/receive units and the modulator/demodulator units. Combining circuitry is responsive to a second control signal from the control circuitry for combining signals associated with at least two of the modulator/demodulator units during a handover operation.

The present invention takes advantage of the characteristic of CDMA systems which permits "soft" handover to be implemented with relatively simplified circuitry. It is therefore preferable that the modulator/demodulator units are implemented with code division multiple access modulator/demodulator units.

In a further preferred embodiment, the modulator/demodulator units comprise digital modulator/demodulator units, and the system further comprises a plurality of analog-to-digital converters and a plurality of digital-to-analog converters connected between the transmit/receive units and the switcher, each of the analog-to-digital converters producing a multi-bit parallel output signal and each of the digital-to-analog converters receiving a multi-bit parallel input signal. In addition, a plurality of parallel-to-serial converters and a plurality of serial-to-parallel converters are connected between the switcher and the modulator/demodulator units, each of the parallel-to-serial converters converting a the multi-bit parallel output signal to a serial output signal and supplying the serial out put to a corresponding one of the modulator/demodulator units and each of the serial-to-parallel converters converting an output signal from a corresponding one of the modulator/demodulator units to a the multi-bit parallel input signal.

According to a second aspect, the present invention provides a communication method for a cellular mobile communication system, wherein the system comprises a plurality of antennas, a plurality of transmit/receive units connected respectively to the antennas for conversion of signals between a radio frequency and a frequency lower than the radio frequency, a plurality of modulator/demodulator units; and a switcher disposed between the transmit/receive units and the modulator/demodulator units. The method comprises the steps of (a) controlling the switcher to establish connections between the transmit/receive units and the modulator/demodulator units, (b) making comparisons between signals from the modulator/demodulator units indicating strengths of signals received by the antennas to determine relative strengths of the signals, (c) determining at least two of the modulator/demodulators according to the relative strengths of the signals during a handover operation, and (d) combining signals associated with the at least two modulator/demodulator units.

In a preferred form of the present invention, the step (a) comprises selecting a first group of mutually adjacent antennas and then selecting a second group of mutually adjacent antennas and controlling the switcher according to the selected first and second groups.

BRIEF DESCRIPTION OF THE DRAWINGS

The present invention will be described in further detail with reference to the accompanying drawings, in which.

DETAILED DESCRIPTION

Figure 1:
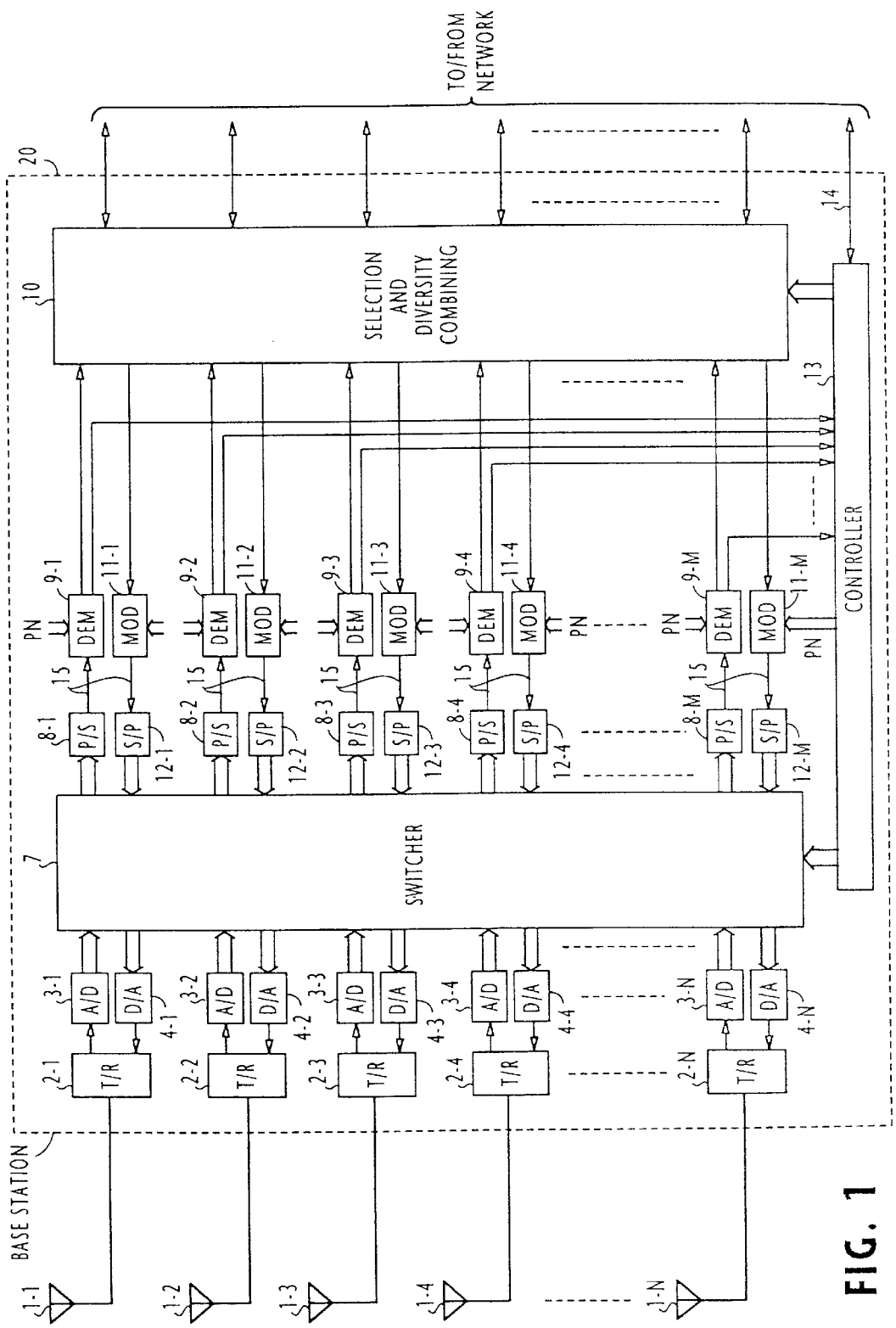
FIG. 1 is a block diagram of a CDMA mobile communication system according to the present invention.

Referring now to FIG. 1, there is shown a CDMA mobile communication system according to the present invention. The system comprises a plurality of antennas 1-1 through 1-N, which may be of a directional type erected in such a way as to cover sector areas, or omni-directional type located alongside of a street, or in dead spot zones, or in equally segmented sub-areas of a cell (i.e., micro-cells). Antennas 1-1 through 1-N are connected respectively to radio-frequency transmit/receive units 2-1 through 2-N located in a cell-site base station 20.

Mobile-transmitted spread-spectrum radio signals are received at the antennas and converted to baseband signals by the respective transmit/receive units and converted to digital signals by corresponding analog-to-digital converters 3-1 through 3-N. A/D converters 3 supply their outputs in multibit parallel form to a switcher 7 having a matrix array of cross-points. In response to a switching control signal from a Controller 13, a set of parallel links is established between the outputs of each A/D converter 3 and one of parallel-to-serial converters 8-1 through 8-M. The number of leads at the output of each parallel-to-serial converter 8 is thus reduced to one and coupled to a corresponding one of digital CDMA demodulators 9-1 through 9-M to which despreading PN (pseudonoise) codes are also supplied from the controller 13 to recover mobile-transmitted baseband signals. The outputs of the demodulators 9 are supplied to the controller 13 as indications of their signal strengths on the one hand and supplied on the other to selection and diversity combining circuitry 10 where they are appropriately selected and diversity-combined under control of the controller 13 and transmitted to a switched network, not shown. The controller 13 is connected to the network via a data line 14 to exchange control signals with the network.

Signals from the network are coupled through the selection and diversity combining circuitry 10 to digital CDMA modulators 11-1 through 11-M to which spreading PN codes are also supplied from the controller 13 to produce digital spread-spectrum signals. The outputs of the modulators 11-1 through 11-M are fed to serial-to-parallel converters 12-1 through 12-M, respectively, where the serial output signal of each modulator 11 is converted to a set of multi-bit lines which are coupled via a set of links established in the switcher 7 to the multi-bit (e.g., 8- or 16-bit) inputs of one of a plurality of digital-to-analog converters 4-1 through 4-N, where the digital spread-spectrum signals from the network are converted to analog signals and supplied to corresponding transmit/receive units 2-1 through 2-N for transmission from the antenna sites.

In a preferred embodiment, the connections between the P/S and S/P converter units 8, 12 and the modulator/demodulator units 9, 11 are implemented with coaxial cables 15 to achieve high speed transfer of signals.

Figure 2:
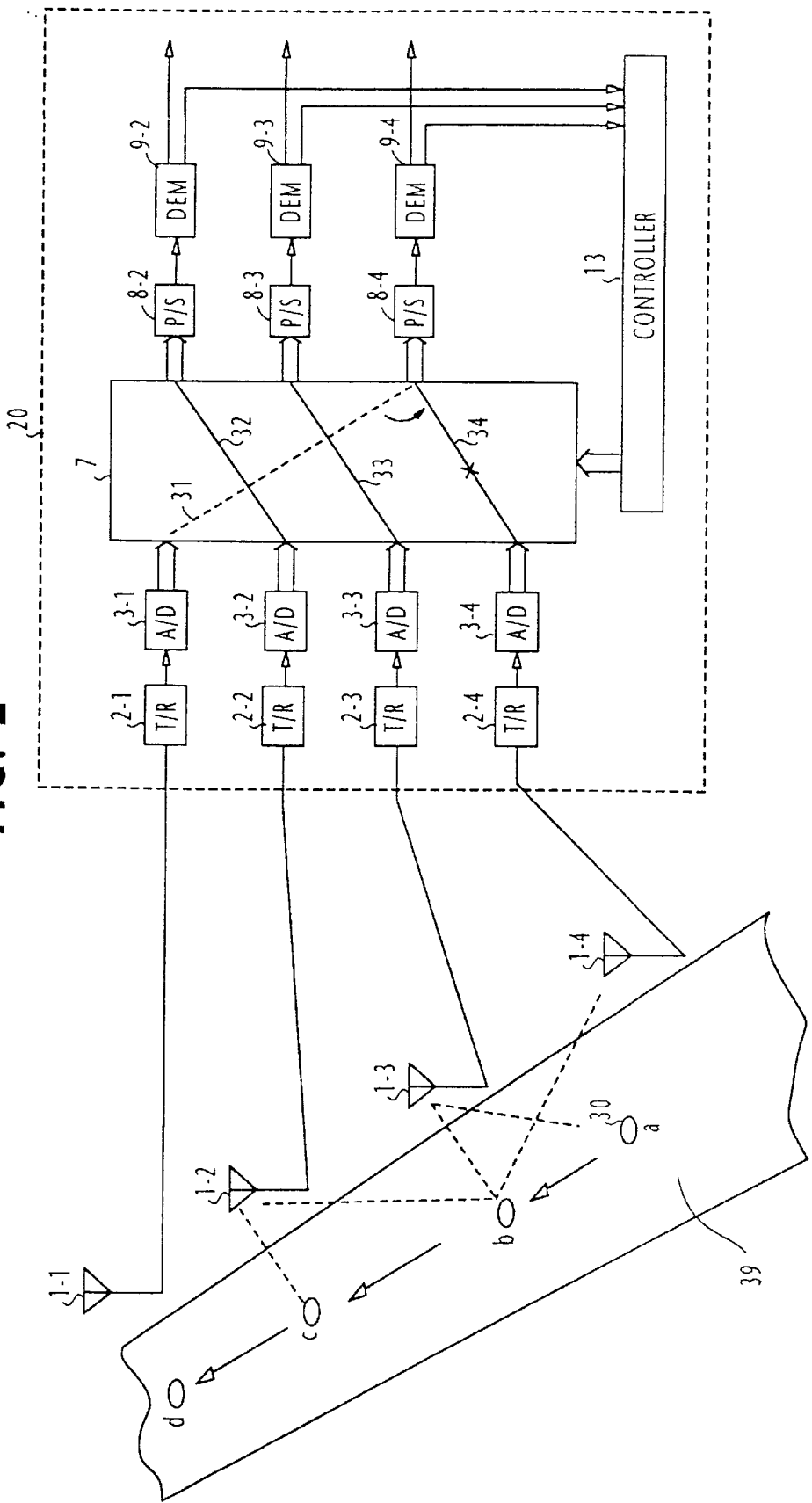
FIG. 2 is a schematic diagram useful for explaining a soft handover operation according to the present invention.

If antennas 1-1 to 1-4 are located alongside of a street 39 as shown in FIG. 2 (in which only receive systems are illustrated for simplicity) and a mobile station 30 is initially located in a position "a" adjacent the antenna 1-3. Controller 13 establishes connections 32, 33 and 34 in the switcher 7 to receive strength indication signals from demodulators 9-2, 9-3 and 9-4, for example, that indicate the strengths of signals received at antennas 1-2, 1-3 and 1-4, and compares them with each other. Controller 13 determines that the signal from the antenna 1-3 is of the highest strength and establishes a radio link between the mobile station and the antenna 1-3. As the mobile station travels toward a position "b" adjacent to antenna 1-2, the strength indication signal of the antenna 1-3 lowers. Controller 13 recognizes that a handover (i.e., intra-cell handover) is necessary and establishes connections 31, 32 and 33 in the switcher 7 and clears the connection 34 to receive strength indication signals from demodulators 9-2, 9-3 and 9-4 to determine the relative strengths of signals received at antennas 1-1, 1-2 and 1-3. Controller 13 recognizes that the mobile station has approached antenna 1-2 and establishes a radio link between the mobile station and antenna 1-2, while retaining the already established radio link to antenna 1-3. Therefore, two radio links are simultaneously established during an intra-cell handover. In this case, the output signals of demodulators 9-2 and 9-3 are diversity combined together in the diversity combining circuitry 10. When the mobile station has moved to a point "c" adjacent antenna 1-2, the strength indication signal from demodulator 9-2 becomes highest and controller 13 clears the radio link between the mobile station and antenna 1-3, thus completing a handover. As a result of the diversity combining, what is called "soft" handover is achieved. If the mobile station still continues moving toward a point "d" which is adjacent antenna 1-1, a similar process to that just described will proceed to effect a soft handover between antennas 1-1 and 1-2.

Although not shown in FIG. 2, signals of the transmit systems are switched in the switcher 7 and diversity combined in the combining circuit 10 in the same way as those of the corresponding receive systems.

Due to the provision of the switcher 7 between the radio frequency side and the modulation/demodulation side of the base station, soft handover can be achieved without using complex circuitry and the number of leads which would otherwise be required between them can be reduced. Furthermore, by the use of A/D converters 3 and D/A converters 4 on one side of the switcher 7 and P/S converters 8 and S/P converters 9 on the other side, signals can be switched at high speeds and hence high-speed digital signal processing can be achieved by demodulators 9 and modulators 11. In addition, the use of P/S converters 8 and S/P converters 9 reduces the number of conductors entering the demodulators 9 and the number of conductors leaving the modulators 11. This is advantageous for implementation of the modulator/demodulator circuitry.

What is claimed is:

1. A cellular mobile communication system comprising:
   a plurality of antennas;
   a plurality of transmit/receive units connected respectively to said antennas for conversion of signals between a radio frequency and a frequency lower than the radio frequency;
   a plurality of modulator/demodulator units;
   control means for receiving signals from said modulator/demodulator units indicating strengths of signals received by said antennas;
   switch means responsive to a first control signal from said control means for establishing connections between said transmit/receive units and said modulator/demodulator units; and
   combining means responsive to a second control signal from said control means for combining signals associated with at least two of said modulator/demodulator units during a handover operation.

2. A cellular mobile communication system as claimed in claim 1, wherein said modulator/demodulator units comprise code division multiple access modulator/demodulator units.

3. A cellular mobile communication system as claimed in claim 2, wherein said modulator/demodulator units comprise digital modulator/demodulator units, further comprising:
   a plurality of analog-to-digital converters and a plurality of digital-to-analog converters connected between said transmit/receive units and said switch means, each of said analog-to-digital converters producing a multi-bit parallel output signal and each of said digital-to-analog converters receiving a multi-bit parallel input signal; and
   a plurality of parallel-to-serial converters and a plurality of serial-to-parallel converters connected between said switch means and said modulator/demodulator units, each of the parallel-to-serial converters converting a said multi-bit parallel output signal to a serial output signal and supplying the serial output to a corresponding one of said modulator/demodulator units and each of the serial-to-parallel converters converting an output signal from a corresponding one of the modulator/demodulator units to a said multi-bit parallel input signal.

4. A cellular mobile communication system as claimed in claim 2, where said frequency lower than the radio frequency signal is a baseband frequency.

5. A cellular mobile communication system as claimed in claim 2, wherein said antennas cover a plurality of equally segmented areas of a cell-site base station.

6. A cellular mobile communication system as claimed in claim 2, wherein said antennas are located alongside of a street.

7. A cellular mobile communication system as claimed in claim 2, wherein said antennas are located in dead spot zones of a cell-site base station.

8. A cellular mobile communication system as claimed in claim 2, wherein said control means is arranged to select a first group of mutually adjacent antennas and then select a second group of mutually adjacent antennas and control said switch means according to the selected first and second group.

9. A cellular mobile communication system as claimed in claim 1, wherein said modulator/demodulator units comprise digital modulator/demodulator units, further comprising:

a plurality of analog-to-digital converters and a plurality of digital-to-analog converters connected between said transmit/receive units and said switch means, each of said analog-to-digital converters producing a multi-bit parallel output signal and each of said digital-to-analog converters receiving a multi-bit parallel input signal; and a plurality of parallel-to-serial converters and a plurality of serial-to-parallel converters connected between said switch means and said modulator/demodulator units, each of the parallel-to-serial converters converting a said multi-bit parallel output signal to a serial output signal and supplying the serial output to a corresponding one of said modulator/demodulator units and each of the serial-to-parallel converters converting an output signal from a corresponding one of the modulator/demodulator units to a said multi-bit parallel input signal.

10. A cellular mobile communication system as claimed in claim 9, wherein connections between said parallel-to-serial converters and said serial-to-parallel converters and said modulator/demodulator units are formed by coaxial cables.

11. A cellular mobile communication system as claimed in claim 1, wherein said frequency lower than the radio frequency signal is a baseband frequency.

12. A cellular mobile communication system as claimed in claim 1, wherein said antennas cover a plurality of equally segmented areas of a cell-site base station.

13. A cellular mobile communication system as claimed in claim 1, wherein said antennas are located alongside of a street.

14. A cellular mobile communication system as claimed in claim 1, wherein said antennas are located in dead spot zones of a cell-site base station.

15. A cellular mobile communication system as claimed in claim 1, wherein said control means is arranged to select a first group of mutually adjacent antennas and then select a second group of mutually adjacent antennas and control said switch means according to the selected first and second groups.

16. A communication method for a cellular mobile communication system, wherein the system comprises a plurality of antennas, a plurality of transmit/receive units connected respectively to said antennas for conversion of signals between a radio frequency and a frequency lower than the radio frequency, a plurality of modulator/demodulator units; and switch means disposed between said transmit/receive units and said modulator/demodulator units, the method comprising steps of:

a) controlling said switch means to establish connections between said transmit/receive units and said modulator/demodulator units;

b) making comparisons between signals from said modulator/demodulator units indicating strengths of signals received by said antennas to determine relative strengths of said signals;

c) determining at least two of said modulator/demodulators according to the relative strengths of said signals during a handover operation; and d) combining signals associated with said at least two modulator/demodulator units.

17. The method of claim 16, wherein the step (a) comprises the steps of selecting a first group of mutually adjacent antennas and then selecting a second group of mutually adjacent antennas and controlling said switch means according to the selected first and second groups.

* * * * *